(12) United States Patent
Riensche et al.

(10) Patent No.: US 8,893,506 B2
(45) Date of Patent: Nov. 25, 2014

(54) IGCC POWER PLANT HAVING FLUE GAS RECIRCULATION AND FLUSHING GAS

(75) Inventors: Ernst Riensche, Juelich (DE); Reinhard Menzer, Simmerath (DE); Ludger Blum, Juelich (DE)

(73) Assignee: Forschungszentrum Juelich GmbH, Juelich (DE)

( * ) Notice: Subject to any disclaimer, the term of this patent is extended or adjusted under 35 U.S.C. 154(b) by 918 days.

(21) Appl. No.: 12/737,982

(22) PCT Filed: Aug. 5, 2009

(86) PCT No.: PCT/DE2009/001114
§ 371 (c)(1),
(2), (4) Date: Mar. 21, 2011

(87) PCT Pub. No.: WO2010/031366
PCT Pub. Date: Mar. 25, 2010

(65) Prior Publication Data
US 2011/0162382 A1    Jul. 7, 2011

(30) Foreign Application Priority Data

Sep. 19, 2008 (DE) .......................... 10 2008 048 062

(51) Int. Cl.
*F02C 6/18* (2006.01)
*C01B 13/02* (2006.01)
(Continued)

(52) U.S. Cl.
CPC ........... *F01K 23/068* (2013.01); *C01B 13/0248* (2013.01); *F02C 3/28* (2013.01); *C01B 3/16*
(Continued)

(58) Field of Classification Search
CPC ............ F01K 23/068; F02C 3/20; F02C 3/28; F02C 6/18; F22B 1/1815; F22B 1/1846; F05D 2220/31; F05D 2220/32; C01B 3/16; C01B 3/501; C01B 13/0248; C01B 2203/0475; C01B 2210/0046; Y02E 20/16; Y02E 20/18

USPC ................................................. 60/781, 39.182
See application file for complete search history.

(56) References Cited

U.S. PATENT DOCUMENTS 4,946,477 A   8/1990   Perka et al.
5,637,259 A   6/1997   Galuszka et al.
(Continued)

FOREIGN PATENT DOCUMENTS

DE    698 11 972    5/1994
DE    44 10 812     9/1995
(Continued)

*Primary Examiner* — J. Gregory Pickett
(74) *Attorney, Agent, or Firm* — Jordan and Hamburg LLP

(57) ABSTRACT

Disclosed is a method for operating an IGCC power plant, wherein the coal gas from a gasifier, comprising CO and hydrogen, is supplied to at least one shift stage, wherein this is converted primarily into $CO_2$ and hydrogen and the coal gas is subjected to at least one gas cleaning step. The coal gas is conducted over a membrane, which at least partially selectively separates the hydrogen from the coal gas. In order to achieve driving potential in the membrane, a flushing gas is used on the permeate side. The hydrogen depleted retentate is fed to a $CO_2$ conditioning process, while the separated hydrogen is fed together with the flushing gas to a gas turbine as fuel gas. The flushing gas used for the membrane is a component of the waste gas produced in the gas turbine after the waste gas has left the waste heat recovery boiler, which is connected downstream of the gas turbine. In the power plant, the gas turbine also functions as a means for providing the flushing gas. The power plant comprises a line from the waste heat recovery boiler connected downstream of the gas turbine to the permeate side of the membrane.

26 Claims, 7 Drawing Sheets

(51) Int. Cl.
  *F02C 3/28* (2006.01)
  *C01B 3/16* (2006.01)
  *F22B 1/18* (2006.01)
  *F01K 23/06* (2006.01)
  *C01B 3/50* (2006.01)
  *F02C 3/20* (2006.01)

(52) U.S. Cl.
  CPC .... (2013.01); *F95D 2220/31* (2013.01); *F02C 6/18* (2013.01); *F22B 1/1815* (2013.01); *C01B 2210/0046* (2013.01); *F05D 2220/32* (2013.01); *C01B 2203/0475* (2013.01); *F22B 1/1846* (2013.01); *C01B 3/501* (2013.01); *F02C 3/20* (2013.01); *Y02E 20/16* (2013.01); *Y02E 20/18* (2013.01)
  USPC .......................................... 60/781; 60/39.182

(56) References Cited

U.S. PATENT DOCUMENTS

| | | | |
|---|---|---|---|
| 6,505,467 | B1 | 1/2003 | Fjellhaug et al. |
| 7,132,002 | B2 | 11/2006 | Aoyama et al. |
| 7,363,764 | B2 | 4/2008 | Griffin et al. |
| 2003/0056440 | A1 | 3/2003 | Aoyama et al. |
| 2005/0061145 | A1 | 3/2005 | Alvin et al. |
| 2008/0098654 | A1 | 5/2008 | Cherry et al. |

FOREIGN PATENT DOCUMENTS

| | | |
|---|---|---|
| DE | 196 51 282 | 6/1998 |
| DE | 698 18 111 | 6/2004 |
| DE | 10 2008 011 771 | 9/2009 |
| EP | 1 295 847 | 3/2003 |
| WO | WO-00/37356 | 6/2000 |
| WO | WO-2007/092084 | 8/2007 |
| WO | WO-2009/106027 | 9/2009 |

IGCC POWER PLANT HAVING FLUE GAS RECIRCULATION AND FLUSHING GAS

The invention relates to a power plant, and more particularly to an IGCC (integrated gasification combined cycle) power plant, and to a method for operating the same.

BACKGROUND OF THE INVENTION

The abbreviation IGCC stands for integrated gasification combined cycle. IGCC power plants are gas and steam turbine power plants (combined cycle (CC) power plants), having a stage for coal gasification connected upstream thereof. During coal gasification, a combustible gas containing carbon monoxide and hydrogen is produced from coal in a gasifier substoichiometrically ($\lambda$ between approximately 0.2 and 0.4). Meanwhile, it is also possible, as an alternative, to use oil, refinery waste, biomass or waste. The product gas is cleaned and supplied to the gas and steam turbine process. This method allows for a gasifier efficiency of 0.6 and, when utilizing the residual heat, an efficiency of 0.8.

The IGCC process allows the technically simple carbon dioxide separation to be performed prior to the actual combustion process, because physically favorable conditions for separation are present in the form of a high overall pressure, and high concentrations of the gas components $CO_2$ and $H_2$ that are to be separated. In two additional steps, the carbon monoxide developed during the gasification can first be converted into carbon dioxide in a shift stage using steam, and then easily separated given the high pressure, and supplied to final waste disposal. This is a considerable advantage as compared to techniques in which the carbon dioxide must be removed from the flue gas. With atmospheric combustion, the flue gas contains more than 80 percent nitrogen, which is very difficult to remove. The IGCC technology can therefore make a significant contribution to lowering carbon dioxide emissions, and thus to reducing the greenhouse effect caused by humans.

A further advantage of the IGCC is the use of a gas turbine comprising a generator that generates electric power from the combustion of the gas, and the combined use of the waste heat of this gas turbine in a downstream steam turbine. Today, system efficiencies of 50 to 55 percent are possible, which clearly exceed the 40 to 45 percent of a regular coal power plant.

Heretofore, power plants of this design (see FIG. 1 or 2) have been operated in a manner wherein the gas produced during the gasification process (coal gas) is supplied directly as fuel gas to the CC process, after the necessary gas cleaning step. A combined cycle power plant (CCPP) is a power plant in which the principles of a gas turbine power plant and steam power plant are combined. A gas turbine is used as the heat source for a downstream waste heat recovery boiler, which in turn acts as a steam generator for the steam turbine. In this CC process, the coal gas is combusted in the combustion chamber of the gas turbine, and a portion of the energy inherent in the gas is converted into mechanical energy by expansion in a turbine process. The existing perceivable heat is utilized in a subsequent steam turbine process. The concentration of carbon dioxide, $CO_2$, in the flue gas of this process is low. Typically, it is below 10% by volume. The $CO_2$ can be separated from the flue gas using the same method that is possible with today's ordinary steam power plants. It should be noted that the technical difficulty of separating the $CO_2$ increases as the concentration of $CO_2$ in the flue gas decreases. The technical difficulty of separating the $CO_2$ negatively impacts the efficiency of the method.

Separating the coal gas into fuel gas, which contains no, or only a small portion of, the carbon compounds CO (carbon monoxide) and $CO_2$ (carbon dioxide), and a gas flow, which exclusively or predominantly contains CO and $CO_2$, is advantageous for the process of separating the $CO_2$ and conditioning the same for final waste disposal.

One possibility is to use a hydrogen membrane to bring about separation of the hydrogen from modified coal gas that is enriched with hydrogen by way of the shift reaction. This results in a residual gas that, depending on the process, may contain such a high proportion of $CO_2$ that it is possible to optionally liquefy the residual gas, and thereby prepare it for final waste disposal. This goal can be achieved, for example, using a membrane that is exclusively or predominantly permeable by hydrogen.

In one embodiment of this variant (FIG. 3), the membrane is used without further flushing, which is to say that, because of the reduced pressure on the permeate side, the hydrogen diffuses by means of the natural driving force through the membrane. A considerable reduction in pressure is required to ensure that the driving force is also sufficient during the course of the separation process and to achieve a sufficiently high degree of separation of the hydrogen. The disadvantage is that the hydrogen produced in this way first has to be compressed from very low pressures to pressures of approximately 25 bar before it can be supplied to the combustion chamber. This $H_2$ recompression requires tremendous amounts of energy and is a key reason for the major efficiency losses in this process.

If a slightly higher pressure level is selected on the permeate side, so as to minimize the energy expenditure for the $H_2$ recompression, a considerable proportion of the hydrogen will disadvantageously remain in the retentate and not be supplied to the CC process. This hydrogen is either lost entirely for power generation, or can be used, after combustion, with oxygen, which is more complex to produce, only to produce power in a steam power process, the efficiency of which is lower than a CC process. During combustion with air, nitrogen would be introduced and the $CO_2$-rich retentate would become disadvantageously polluted. Göttlicher [1] reports on earlier studies conducted on variants of such a concept.

A further modification of the IGCC process was likewise cited by Göttlicher [1]. Göttlicher also proposes the use of compressed nitrogen as a flushing gas as one possible way to improve the separation of hydrogen. To this end, the nitrogen is obtained from an air separation facility required for the gasification, as is done with the otherwise conventional IGCC process (see FIG. 4). The flushing mass flow of $N_2$ generally approximately corresponds to that of the hydrogen diffused through the membrane.

The flushing gas has thus changed at the outlet from the membrane and is now composed of about one half each of $N_2$ and $H_2$. The $H_2$ partial pressure has risen to a value that is approximately half as high as the overall permeate pressure. The $H_2$ partial pressure on the feed side located directly opposite thereof, at the inlet of the feed into the membrane, is also approximately half the total pressure. This results in a driving force in the membrane that is substantially equal to zero, so that high separation degrees for $H_2$ can, at best, only be achieved with unreasonably large membrane surfaces.

DE 10 2008 011 771 describes a further IGCC power plant comprising $H_2$ membranes, wherein the first flushing gas source, in the form of an air separation facility, is supplemented by a further, stronger flushing gas source. So as to further improve the efficiency, the flue gas can be recirculated from the downstream steam turbine to the combustion chamber of the gas turbine (see FIG. 5). The flue gas recirculation, following stoichiometric air combustion, represents a second possible flushing gas source, which is distinguished by a low oxygen content. For this purpose, a portion of the gas turbine combustion chamber waste gas, which is already under high pressure, is conducted to the permeate side of the membrane. This effect is even better as the content of $O_2$ in the flue gas decreases, because oxygen may react directly with the $H_2$ permeate and would cause an unacceptably high increase in the temperature inside the $H_2$ membrane, for example of several hundred degrees. So as to keep the oxygen content of the waste gas/flue gas as low as possible, generally a substantially stoichiometric ratio of air and fuel ($H_2$ gas) is employed, which is reflected in the parameter $\lambda \sim 1$. In the standard IGCC, hyperstoichiometric air separation is carried out, and thus the large nitrogen-rich flue gas flow generally contains more than 10 mole percent oxygen, and thus is not suited as a flushing gas in this form.

The waste gas from the combustion chamber usually has temperatures above 1200° C., so that the flue gas first has to be cooled before being supplied to the $H_2$ membrane. The high-temperature recuperators required for this are generally expensive and/or are not available and may cause even further energy losses, for example when a final cooler is provided at the end of the hot side of the recuperator, which disadvantageously impacts the energy balance of the overall system.

SUMMARY OF THE INVENTION

It is an object of the invention to provide an improved IGCC power plant, wherein a pressurized waste gas is produced, which comprises almost exclusively $CO_2$ and can therefore be liquefied with little additional energy expenditure. It is a further object of the invention to provide such an IGCC power plant having a simplified process, as compared to the known prior art, combined with an energetically improved supply of flushing gases. It is another object of the invention to provide a method for operating such an IGCC power plant, which has the aforementioned properties.

The objects of the invention are achieved by an IGCC power plant having all the characteristics according to the main claim and by a method for operating the same according to the additional independent claim. Advantageous embodiments of the power plant and of the method are disclosed in the claims relating to them, respectively.

The invention relates to an IGCC power plant comprising membranes for the purpose of separating gases utilizing flushing gases, and to a method for operating the same, which advantageously makes it possible to yield the flushing gases within the IGCC process.

The principle of the power plant according to the invention is based on the IGCC power plant comprising a membrane known from Göttlicher [1], however, the flushing gas for the membrane is not provided externally, for example by an air separation facility, but this flushing gas is advantageously primarily withdrawn directly from the process. Contrary to DE 10 2008 011 771, where the flue gas/waste gas of the gas turbine combustion chamber is used as the membrane flushing gas, and flue gas recirculation of the waste gas from the waste heat recovery boiler back into the gas turbine combustor is additionally provided for, in the present invention a portion of the waste gas of the gas turbine is advantageously used directly as a flushing gas for the $H_2$ membrane, after passing through the waste heat recovery boiler for the steam turbine, and is compressed even before the membrane to the necessary pressure for the subsequent combustion.

After the flushing gas has made the detour over the membrane and become enriched there with $H_2$, it also fulfills the original function thereof in the burner, which is to say to deliberately cool the combustion process so that the desired turbine inlet temperature is reached. While this cooling originally took place by way of air, the $O_2$ component is now absent, which is compensated for by an accordingly higher amount of $N_2$. A further difference from DE 10 2008 011 771, where the flushing gas quantity on the inside of the two gas cycle can be freely selected, is that in the present invention the flushing gas quantity is clearly defined by the overall conditions of the gas turbine process. However, it has been shown that the resulting typical flushing gas quantities are completely sufficient to be able to operate the membrane separation process very inexpensively. Contrary to DE 10 2008 011 771, where a complex high-temperature recuperator is required, in the present invention, the simple process (only one gas cycle) results in no, or only little, additional expenditure for converting the air burner cooling into burner cooling with recirculated $O_2$-free $N_2$ waste gas, for the purpose of additionally sending this gas upstream of the burner (again without significant energy expenditure) as flushing gas through the permeate side of the $H_2$ membrane.

The method according to the invention described here is particularly advantageous as compared to the conventional IGCC methods because it yields waste gas that is almost exclusively composed of $CO_2$, which is additionally produced under pressure. This waste gas can be liquefied with little additional energy expenditure, and the pressure required for final waste disposal can also be produced with little additional energy expenditure in light of the liquid $CO_2$. In general, no step other than conditioning the waste gas for enrichment of the $CO_2$ is required, because all necessary steps are integral components of the method.

Compared to the existing known method proposed by Göttlicher (FIG. 4 in [1]), this has the advantage that the flushing gas for separating the hydrogen does not need to be entirely externally supplied to a membrane, for example from an air separation facility, but is produced predominantly within the process.

Compared to the IGCC power plant from the application DE 10 2008 011 771, the power plant according to the invention has the advantage that the flushing gas for separating the hydrogen is also advantageously produced within the process, however, two cycles are not required, but rather only one. The flushing gas used is not the high-temperature waste gas from the combustion chamber, but the moderately hot waste gas from the waste heat recovery boiler.

Compared to the IGCC power plants known from the prior art, the IGCC power plant according to the invention has a cycle system that comprises a hydrogen membrane for separating hydrogen from the process gas, a combustion chamber of the gas turbine, the gas turbine itself, and a waste heat recovery boiler connected downstream of the gas turbine to generate the steam for a steam turbine. The lines for the cycle system run from the waste gas side of the waste heat recovery boiler to a "large" $N_2$ compressor, from there to the permeate side of the hydrogen membrane, and from there to the combustion chamber of the gas turbine and on to the gas turbine and the waste heat recovery boiler. The "large" $N_2$ compressor has substantially taken the place of the original "large" air compressor, and in keeping with the now only stoichiometric air supply only a "small" air compressor is present. As described in DE 10 2008 011 771, where flue gas recirculation is also provided for, a compressor is provided in the flue gas recirculation so as to generate the pressure required in the burner of the gas turbine. During operation of the power plant, the pressure level on the permeate side of the membrane is identical to the pressure in the burner, and this pressure is identical to the gas turbine inlet pressure, because an additional compression stage, solely for the membrane, does not appear to be expedient. Optionally, and depending on the $H_2$ membrane that is used, this cycle system may also comprise heat exchangers disposed upstream and downstream of the hydrogen membrane, a fan, or an additional preheater.

To operate an IGCC power plant, fuel in the form of coal, biomass, or waste is substoichiometrically ($\lambda$ between approximately 0.2 and 0.4) gasified into energy-rich gas in a gasifier. The resulting raw gas is cooled, wherein the waste heat is already introduced to a steam turbine cycle. Subsequently, the raw gas is cleaned and run through desulfurization facilities, filters and similar units. At this point, the gas is combusted in a gas turbine, with the combustion chamber often being integrated in the turbine housing. The waste heat is used to evaporate fluid in a secondary cycle. The steam as such is conducted through a steam turbine and expanded almost to a vacuum. The residual heat may be fed to a heat transfer network. In modern IGCC power plants, the CO present in the raw gas is converted into $CO_2$ by way of a shift stage and is then separated. To this end, both physical scrubbers and membranes may be employed.

In the method according to the invention for operating an IGCC power plant, a membrane that selectively separates hydrogen is employed. The fuel, notably coal, is gasified with the help of oxygen, advantageously from an air separation facility, and is conducted over a CO shift stage, and supplied to the $H_2$ membrane. The hydrogen transported through the membrane is supplied to the gas turbine combustion chamber together with the nitrogen of the flushing gas. In the combustion chamber, air is supplied in such a ratio that the resulting flue gas contains only small quantities of oxygen, so that the flue gas can be conducted as a flushing gas to the permeate side of the $H_2$ membrane after passing through the waste heat recovery boiler. Small quantities as defined by the present invention shall be understood to mean proportions of 0.1 to 1% by volume.

So as to achieve a suitable air to coal gas ratio, the air is supplied to the combustion chamber notably in a substantially stoichiometric ratio ($\lambda$~1). In combustion engineering, the $\lambda$ symbol denotes the combustion air ratio. In combustion engines, the air-fuel ratio (stoichiometric ratio) is stated as $\lambda=1$ when the optimal ratio, for example, of 4.7 kg air to 1 kg fuel (for gasoline) exists. $\lambda>1$ denotes excess air and $\lambda<1$ denotes a lack of air. Within the scope of the present invention, a substantially stoichiometric ratio ($\lambda$~1) shall generally be understood as a ratio of $\lambda=1\pm0.1$.

In the method according to the invention, the flue gas, predominantly comprising $N_2$ and having temperatures around 400° C. after recompression, can advantageously be supplied directly to the $H_2$ membrane, without any interposed heat exchangers. Known porous, ceramic membranes typically operate at temperatures between approximately 150 and 400° C. Above 400° C., sintering processes can disadvantageously change the pore structure. Below 150° C., water, which in most applications of membrane power plants is present on the feed or permeate side, can result in blockage of the pores. The development of silica membranes has progressed quite far, however they exhibit stability problems in the presence of steam. For this reason, presently $TiO_2$ and $ZrO_2$ membrane layer structures are also under development. As differs from polymer membranes, with these ceramic membranes the pressure levels on both sides of the membrane should generally be substantially identical, because problems may otherwise occur in terms of the mechanical stability.

However, if the $H_2$ membrane used for the hydrogen separation requires different operating temperatures, it is also possible to adapt this concept without difficulty. For this purpose, in one embodiment of the invention, a portion of the permeate flow ($H_2/N_2$ gas mixture of the outflowing flushing current) could be supplied to the inflow flushing current ($N_2$) by means of a circulating fan, which overcomes the pressure loss that takes place in the membrane, wherein this portion is burned in a preheater and the heat that is produced in the process is used directly to preheat the flushing gas before it enters the filter. As an alternative, the combustion heat could also be coupled in by way of a heat exchanger, for example if the introduction of product water into the membrane is to be prevented. In this case, the combustion gas would not return to the membrane and would be supplied directly to the burner of the gas turbine.

The required quantity of permeate to be burned, notably of the hydrogen yielded, depends on the required end temperature of the flushing gas and the mass flow thereof. A typical case would be the increase of the flushing gas temperature from 400 to 600° C. For this purpose, approximately 15% by volume or by weight of the permeate would have to be burned in the preheater (by comparison, according to FIG. 6, the entire permeate supplies so much thermal heat that the temperature increase of the approximately 1.5 times greater $N_2$-rich gas flow in the burner of the gas turbine is 4 times greater (400-1200° C.)). Such high operating temperatures for the flushing gas are particularly desirable when the membrane is a mixed protonic-electronic conductor. This conductor generally requires temperatures between 500 and 700° C. for optimal operation.

In a further embodiment of the invention, a polymer membrane is used for the hydrogen separation. In this case, the optimal operating temperature of the $H_2$ membrane is around 100° C., so that the flushing gas, before entering the membrane, is first cooled to this temperature by a recuperative heat exchanger. In the recuperative design, this cooling is accompanied by simultaneous heating of the permeate before this is introduced into the combustion chamber. Even this arrangement constitutes a considerable improvement in terms of process engineering compared to the process described in DE 10 2008 011 771 because, in this case, only low-temperature recuperators having low complexity are required, while in DE 10 2008 011 771 the heat exchangers must operate at a considerably higher temperature level (T>1000° C.).

Regardless of the selected operating temperature of the $H_2$ membrane, the process according to the invention also allows additional support of the flushing gas mass flow by supplying compressed $N_2$ from an air separation facility. Compressed $N_2$ here shall be understood as nitrogen gas at a pressure of at least approximately 20 bar, which is typically provided by an air separation facility specified for IGCC.

The invention advantageously combines a process for an IGCC power plant that is simplified, as compared to the known prior art, and has an improved energy balance. In addition, it can be adapted to the use of different hydrogen membranes and the related operating temperatures. An essential part of the invention is that, contrary to the standard IGCC, the waste gas from the gas turbine does not contain any, or only very little, oxygen and, because of this property, is suited for use as a flushing gas. The absence of oxygen is achieved by a sufficiently low, substantially stoichiometric fresh air supply. The absence of oxygen in the flushing gas ensures that the hydrogen that has permeated through the membrane does not burn when admixed to the flushing gas, which would result in unacceptably high increases in the temperature of the flushing gas and the membrane.

The IGCC power plant according to the invention, suited for carrying out the method, therefore comprises a gasifier for gasifying a solid fuel, a means for providing oxygen for the gasifier, at least one shift stage connected downstream of the gasifier for converting CO and steam into $CO_2$ and hydrogen, at least one gas cleaning stage connected downstream of the gasifier, a hydrogen-selective membrane connected downstream of the gasifier, a means for providing flushing gas for the permeate side of the membrane, and a gas turbine, wherein a line leads from the permeate side of the membrane to the combustion chamber of the gas turbine, and the means for providing the flushing gas is the gas turbine, and a further line is disposed from the waste heat recovery boiler connected downstream of the gas turbine to the permeate side of the membrane filter.

The IGCC power plant concepts known from the prior art, as presented in the introductory part of the present application, are shown in FIGS. 1 to 5. The concept of an IGCC power plant according to the invention and the individual method steps for operating the same will be explained in detail hereinafter based on schematic diagrams (FIGS. 6 to 8), wherein FIGS. 7 and 8 each show particularly advantageous embodiments of the invention.

DESCRIPTION OF THE PREFERRED EMBODIMENTS

Figure 9:
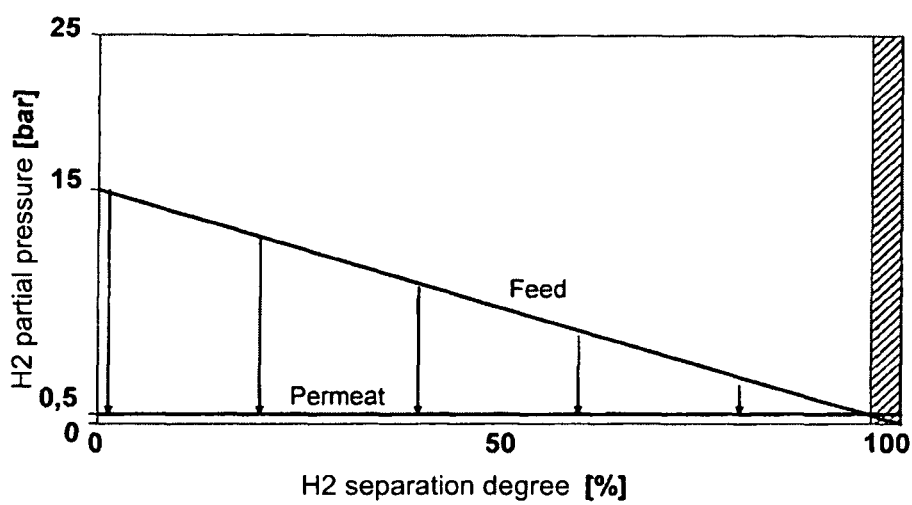
FIG. 9: is an example of an unflushed $H_2$ membrane (see concept according to FIG. 3)
Figure 10:
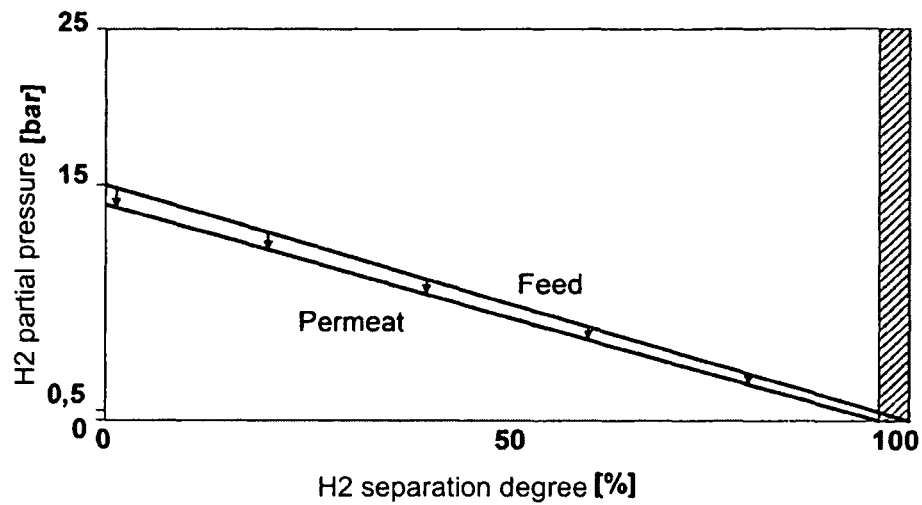
FIG. 10: is an example of a moderately flushed $H_2$ membrane (see concept according to FIG. 4)
Figure 11:
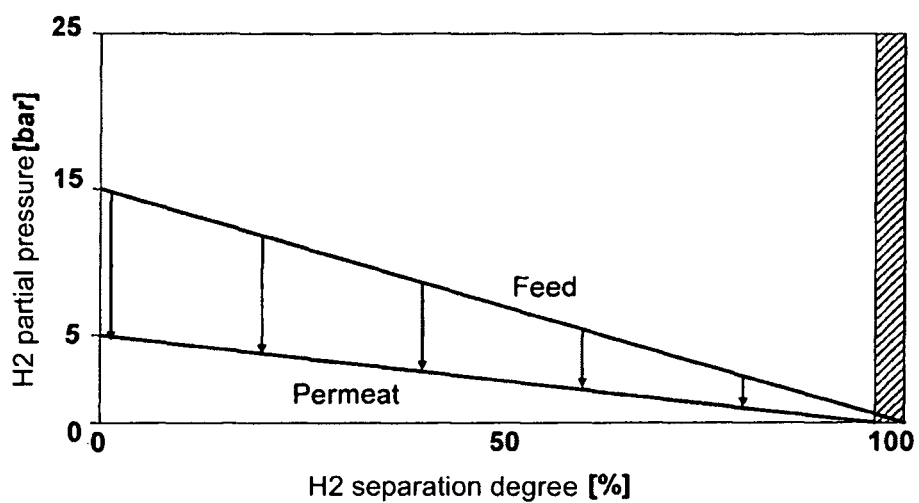
FIG. 11: is an example of a strongly flushed $H_2$ membrane (see concepts according to FIGS. 5 to 8)

In FIGS. 1 to 8 the following meanings apply:
1 Gasifier
2 Coal gas conditioning, optionally includes a shift stage
3 $H_2$ membrane
4 Combined cycle power plant, comprising:
    4a Combustion chamber of the gas turbine
    4b Gas turbine
    4c Waste heat recovery boiler
    4d Steam turbine
5 Air separation facility, and
6 Compressor
7 Heat exchanger
8 Preheater Examples of a simulated hydrogen separation process are described in FIGS. 9 to 11 to provide a better understanding of the driving forces prevailing there.

In the IGCC process according to the invention (FIGS. 6 to 8), the fuel, notably coal, is gasified in a gas flow having a low oxygen component. The ratio of the oxygen component to the component of nitrogen and argon should advantageously range approximately 20. In addition to oxygen, the gas flow may contain steam and $CO_2$. To this end, the conditioned coal is converted in a gasifier (1) at high temperatures in the aforementioned gas flow at increased pressure, and preferably no less than 30 bar, into carbon monoxide-rich, hydrogen-containing process gas. This process is typically carried out at temperatures between 800 and 1500° C. The resulting gas is cooled. The excess heat is utilized in the overall process.

In a shift process (2), the carbon monoxide-rich process gas is subsequently converted to a hydrogen-rich product gas, which now contains the carbon dioxide to be separated. Matching the individual process steps, the process gas is subjected to different gas cleaning stages comprising solid matter and sulfur separation, which are not described in detail here. These gas cleaning steps can be disposed upstream of, downstream of, and between the individual shift stages. Steps necessary for gas cleaning may also be disposed within the shift stages.

In the method according to the invention, the coal gas should be separated from the $CO_2$-containing gas flow by way of a specific operating membrane. To this end, in a further step, hydrogen ($H_2$), as the energy-carrying component, is separated from the product gas flow using a hydrogen-permeable membrane (3). The remaining coal gas enriched in this way, which is substantially $CO_2$-free, is then supplied to the combined cycle (CC, 4a-4d) power plant. The $CO_2$-rich residual gas containing only little $H_2$ remains under the operating pressure of the gasification and can be supplied to a conditioning process (remaining $H_2$ combustion, drying and compression to approximately 100 bar for $CO_2$ transport and storage).

The membrane (3) is preferably a membrane that conducts hydrogen ions, which is to say protons, and because of this transport mechanism is distinguished by high selectively for $H_2$ as compared to $CO_2$. It is also possible to use a different membrane that is suited for separating hydrogen. In particular porous, ceramic membranes, mixed protonic-electronic conductors, and polymer membranes should be mentioned as $H_2$ membranes suitable for this purpose.

In the separating step, a flushing gas is used on the permeate side. This flushing gas normally has the same or similar pressure as that of the burner at the inlet to the gas turbine, because recompression of the flushing gas exiting the membrane is not provided for. In general, the process gas in the membrane has the same or similar pressure as that of the gasification, and in general the gasification has the same or similar pressure as that of the gas turbine.

However, conceivable applications of the $H_2$ membrane in the IGCC also include those in which the aforementioned pressure conditions are not approximately 1, and may certainly range up to approximately 2.

a) With membranes that have excellent mechanical stability, it may be advantageous to cut the permeate pressure in half, for example, so as to increase the driving force. In this case, the energy expenditure for the $H_2$ recompression still appears to be acceptable, compared to, for example, 6-fold pressure doubling from 0.5 to 32 bar in the case of a concept having a permeate vacuum instead of flushing.

b) Even today, IGCC developments are apparent in which the gasification pressure is raised considerably, in the range of 50 bar and above, which is to say approximately twice as high as the gas turbine pressure, which has changed less in the course of the development. With membranes that have excellent mechanical stability, it may also be advantageous to leave the permeate pressure equal to the gas turbine pressure, and to also leave the process gas pressure equal to the (now very high) gasifier pressure, so as to further increase the driving force.

Compared to ceramic membranes, polymer membranes appear to be suited well for use when high differential pressures occur. Their range of application today is 1 to 150 bar on the process gas side and 50 mbar to 20 bar on the permeate side (information according to BORSIG GmbH). In membrane plants using polymer membranes, $CO_2$ is already separated from natural gas, which is still under high pressure after production.

Hydrogen is withdrawn from the process gas, which on the primary side (process gas side, retentate side) comes in contact with the membrane, in that the hydrogen migrates through the membrane. The partial pressure difference of the hydrogen between the primary and permeate sides is the driving potential. The permeate side is the secondary side, which is to say the side of the membrane to which the hydrogen migrates. So as to maintain the hydrogen partial pressure difference, the supply of flushing gas must always be sufficient.

A step in this method that is essential to the invention is that the flushing gas is yielded directly from the combustion product of the gas turbine (4a), and more specifically only after the waste gas from the gas turbine (4b) has passed through the downstream waste heat recovery boiler (4c). At this point, the combustion product is present in a depressurized state (approximately 1 bar) and has a low temperature. The amount of waste gas that is withdrawn is always the amount that is required to limit the combustion temperature in the combustion chamber (4a) of the gas turbine. A combination compressor (6) both for $N_2$ (recirculated flue gas) and for air, which must be operated at uniform pressure, brings the gas flows, which are supplied in particular for the purpose of cooling the gas turbine combustion chamber (4a), to the necessary pressure level of the gas turbine.

The flushing gas substantially contains nitrogen, steam, and only a very small proportion of oxygen, because the combustion in the gas turbine (4a-4b) is generally carried out with a substantially stoichiometric oxygen-fuel ratio (as a further step of the method that is essential to the invention) ($\lambda \sim 1$), and low quantities of $CO_2$ and argon. A possible gas composition would be the following, for example:

$N_2$: 65-75% by volume
$H_2O$: 25-30% by volume
$O_2$: 0.6-1% by volume
$CO_2$: 0.6-1% by volume
Ar: 0.7-0.9% by volume When using a membrane for which steam in such high concentration (caused by the enrichment due to the cycle system) cannot be tolerated, measures must be taken that lower the water content after outlet from the waste the heat recovery boiler (4c) to the necessary value, for example by cooling and condensation.

The excess of oxygen is also low because the flushing gas flow at the inlet into the membrane is primarily composed of recirculated flue gas. This recirculated flue gas is advantageously used as the flushing gas for the hydrogen membrane and also as a heat-absorbing gas for limiting the combustion temperature in the combustion chamber (4a) of the gas turbine.

A particularly advantageous operating temperature will be obtained for the membrane (3) depending on which type of $H_2$ membrane is selected for the hydrogen separation. Porous ceramic membranes, for example, operate particularly advantageously around 400° C., while mixed protonic-electronic conductors prefer higher temperatures between 500 and 700° C., and more particularly between 550 and 600° C. On the other hand, polymer membranes can also be used, however they should usually not be operated at more than 100° C.

In the embodiment of the IGCC process according to the invention, the recirculated flue gas is first at low temperatures downstream of the waste heat recovery boiler and upstream of the $N_2$ compressor (6). It is then raised to a temperature of approximately 400° C., in the $N_2$ compressor (6), during the compression from 1 bar to approximately 25 bar (with intercooling), so that advantageously no further temperature adjustment of the recirculated flue gas/flushing gas is required when using a porous, ceramic membrane (see FIG. 6).

Figure 1:
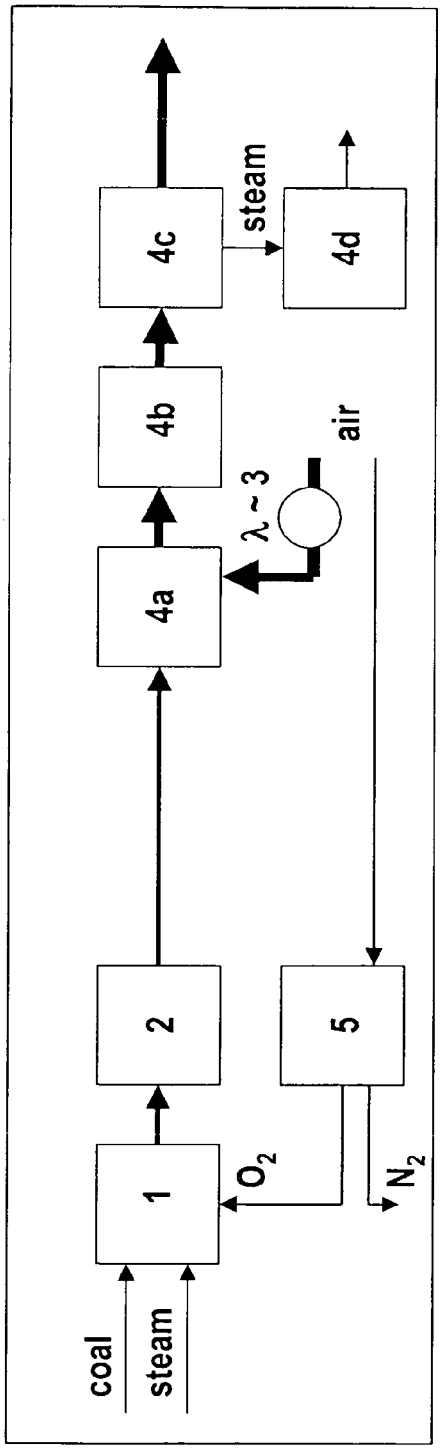
FIG. 1: is an IGCC process having no integrated air separation facility.
Figure 2:
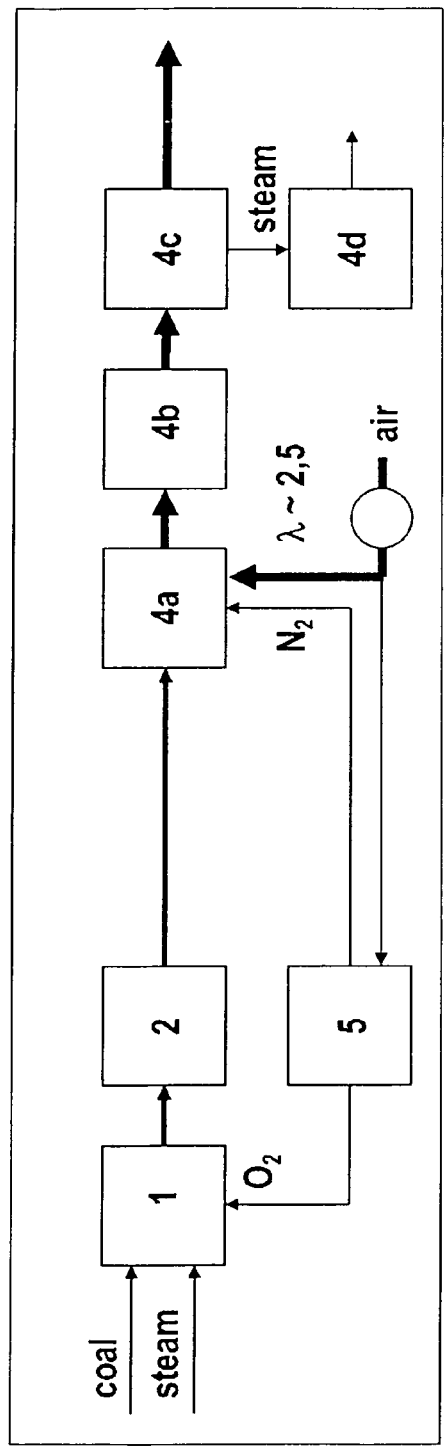
FIG. 2: is an IGCC process having an integrated air separation facility.
Figure 3:
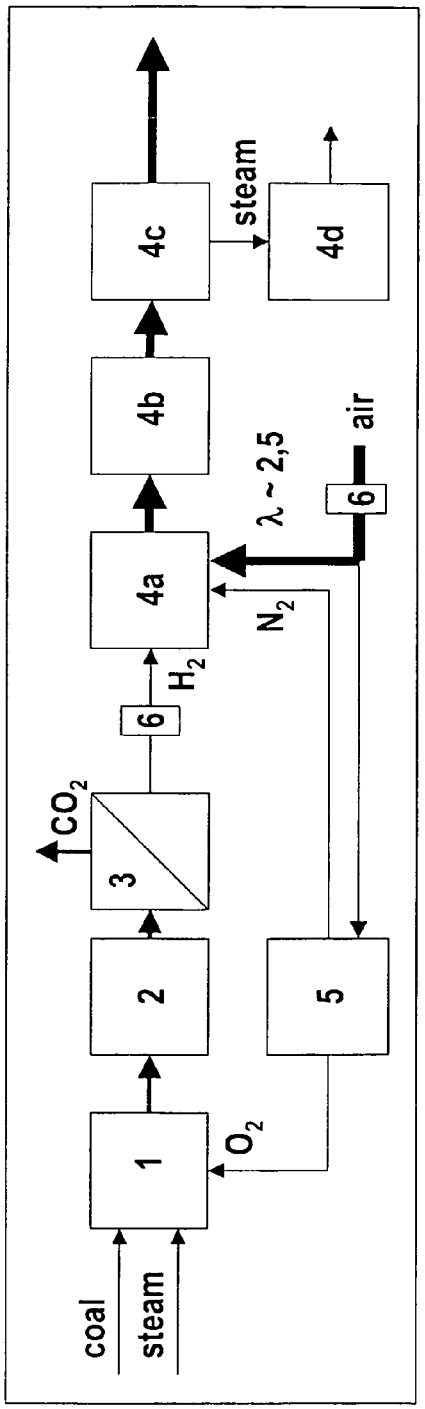
FIG. 3: is an IGCC process having an integrated air separation facility and an unflushed $H_2$ membrane for the separation of $CO_2$.
Figure 4:
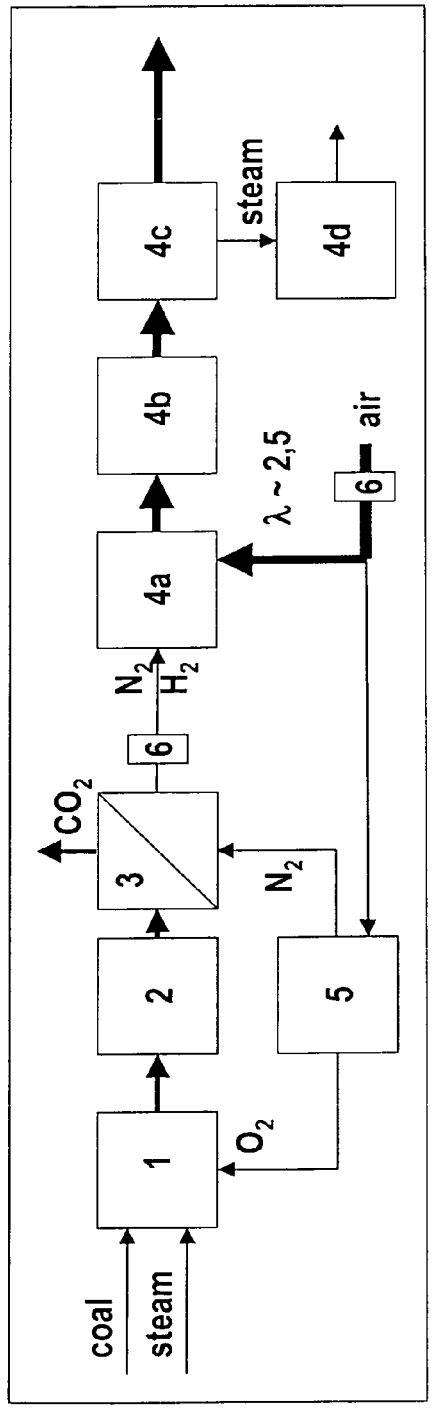
FIG. 4: is an IGCC process having an integrated air separation facility and a modestly flushed $H_2$ membrane for the separation of $CO_2$, the $N_2$ flushing gas originating entirely from the air separation facility, from [1]
Figure 5:
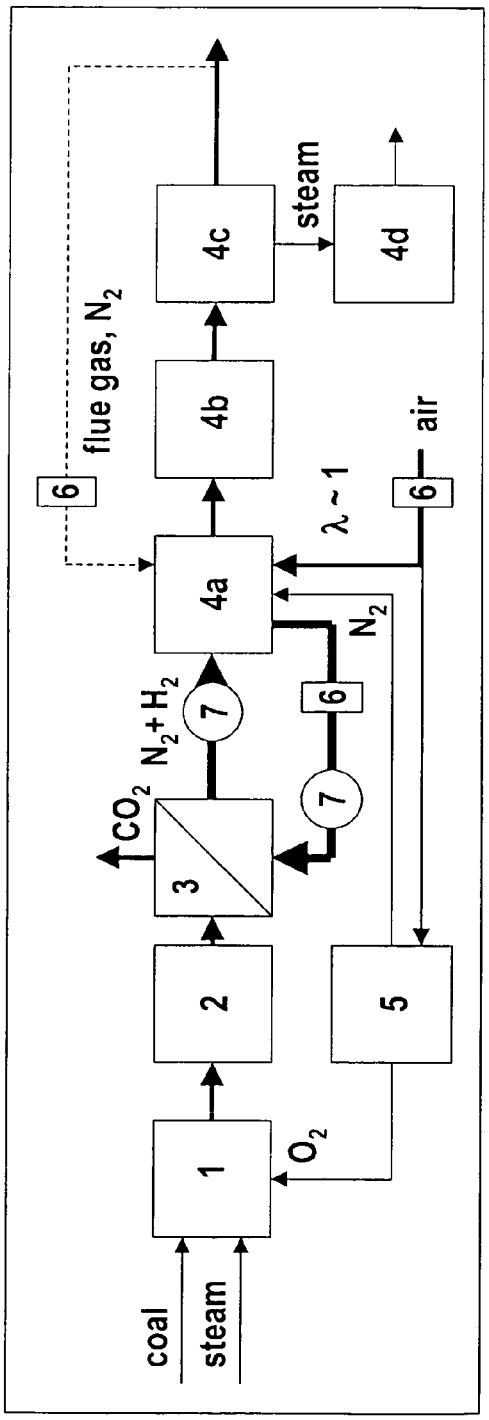
FIG. 5: is an IGCC process having an integrated air separation facility and a strongly flushed $H_2$ membrane for the separation of $CO_2$, the $N_2$ flushing gas originating from the waste gas of the gas turbine combustion chamber [from DE 10 2008 011 771]
Figure 6:
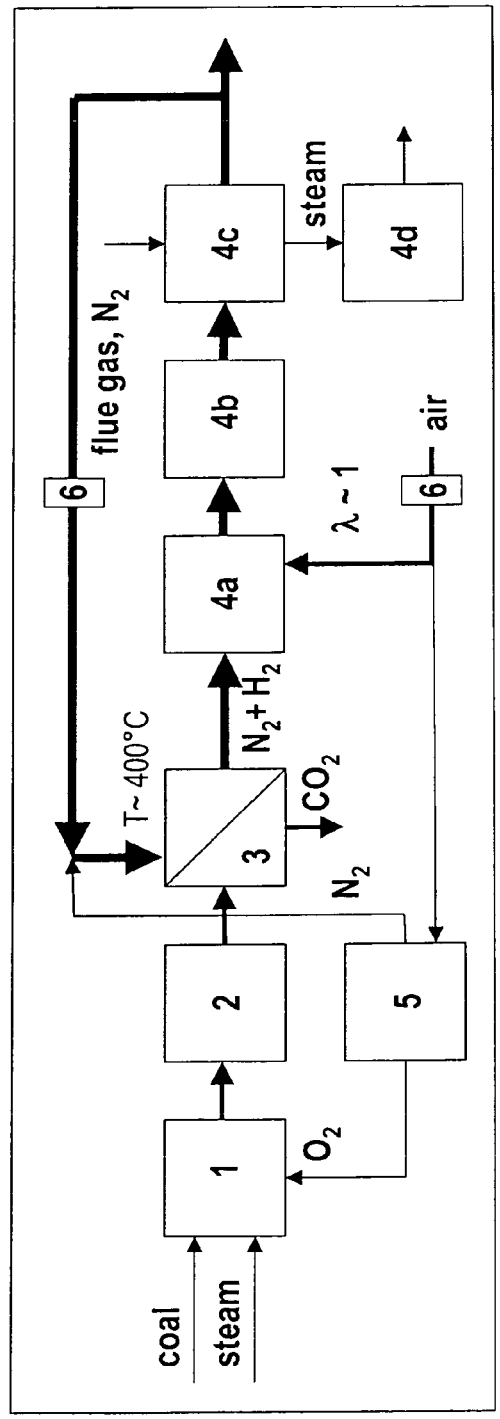
FIG. 6: is an IGCC process according to the invention having an integrated air separation facility and a strongly flushed $H_2$ membrane for the separation of $CO_2$, the $N_2$ flushing gas originating from the waste gas of the waste heat recovery boiler and optionally additionally from the air separation facility.
Figure 7:
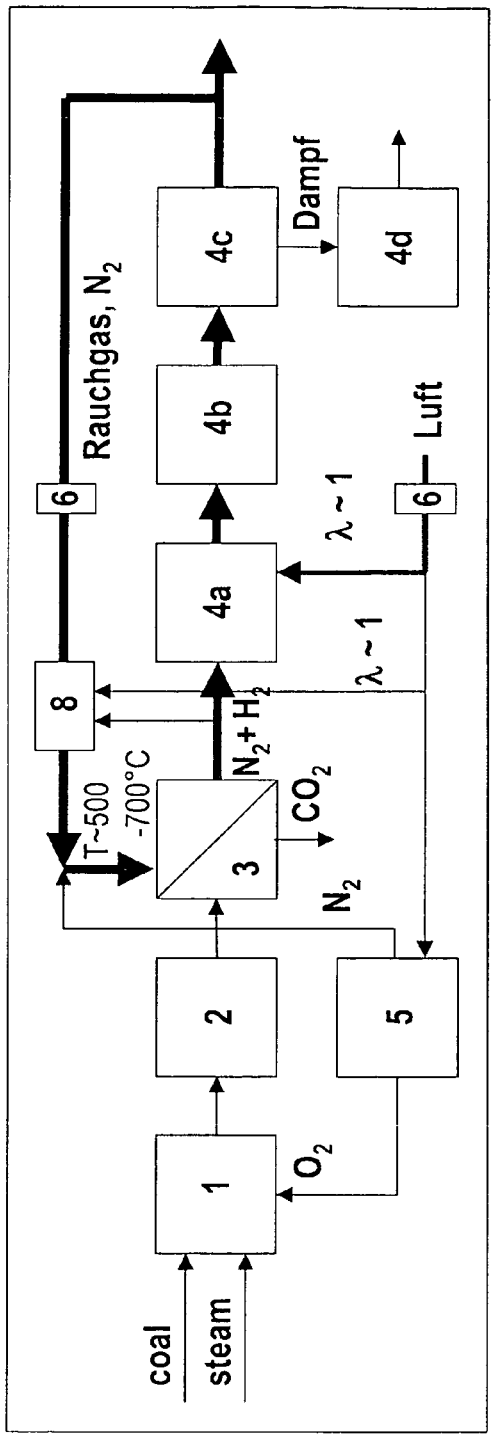
FIG. 7: is an IGCC process according to the invention having an integrated air separation facility and a strongly flushed $H_2$ membrane for the separation of $CO_2$, the $N_2$ flushing gas originating from the waste gas of the waste heat recovery boiler and optionally additionally from the air separation facility, with an additional preheating cycle for raising the flushing gas temperature from approximately 400 to 500-700° C. at the inlet into the membrane so as to be able to operate a membrane having characteristic operating temperatures of 500-700° C.
Figure 8:
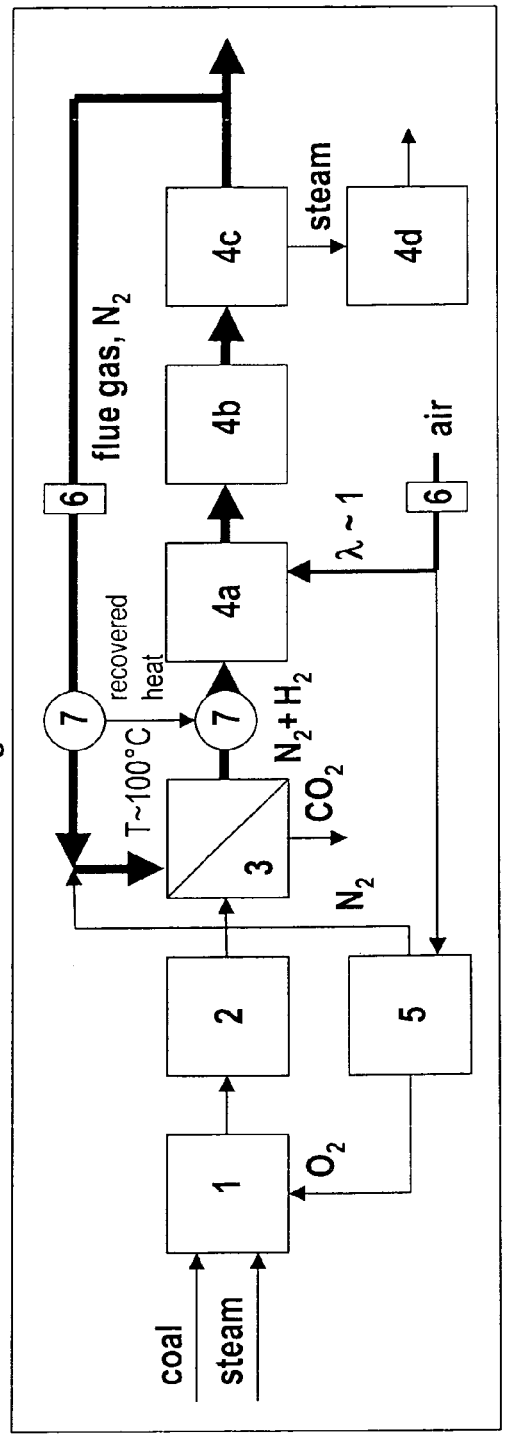
FIG. 8: is an IGCC process according to the invention having an integrated air separation facility and a strongly flushed $H_2$ membrane for the separation of $CO_2$, the $N_2$ flushing gas originating from the waste gas of the waste heat recovery boiler and optionally additionally from the air separation facility, with an additional recuperative heat exchanger for lowering the flushing gas temperature from approximately 400° C. to 100-300° C. at the inlet into the membrane so as to be able to operate a membrane having characteristic operating temperatures of approximately 100-300° C.

If a mixed protonic-electronic conductor is provided as the hydrogen membrane, the process can be adjusted to the effect that a portion of the hydrogen/nitrogen mixture produced in the permeate area of the membrane is burned substantially stoichiometrically with small quantities of oxygen in a partial combustion step in a preheater (8) (see FIG. 7). The heat produced in this way can be used to sufficiently heat the flue gas/flushing gas on the permeate side of the $H_2$ membrane having insufficient temperatures. In this $H_2$ membrane (3), hydrogen permeates, for example in the form of protons, from the process gas side, which is the feed and retentate side, to the permeate side and is supplied to the flushing gas in this way.

In addition to the flushing gas, the gas flow present on the permeate side downstream of the membrane contains the essential quantity of hydrogen produced in the gas generation process. This gas substantially comprises nitrogen and hydrogen and is present at a pressure that allows this gas to flow as coal gas into the combustion chamber of the gas turbine.

FIGS. 9 to 11 show, by way of example, the $H_2$ separation as a function of different boundary conditions, in particular as a function of the permeate-side overall pressure and the quantity of $N_2$ flushing gas that is used. The following were predefined:

Feed=shifted coal gas at 25 bar ($CO_2$=40 mole percent, $H_2$=60 mole percent) and Permeate=$H_2(CO_2)$ in FIG. 9 at 0.5 bar and Flushing gas+permeate=$N_2+H_2$ ($CO_2$) in FIGS. 10-11 at 25 bar.

FIG. 9 shows the circumstances for an unflushed $H_2$ membrane. The driving force is high upon entering the membrane, for example 14.5 bar, and initially the $H_2$ separation is progressing well. However, when the high separation degree range, which is extremely important with respect to the energy yield, is reached over the course of the separation process (90% separation and higher), the driving force decreases to zero before 100% separation is reached. This means that only degrees of separation that are considerably below 100%, for example 90%, can be implemented. 10% of the hydrogen will then not be available for power generation in the CC process. Additionally, in the example selected, the permeate (pure hydrogen) only has a pressure of 0.5 bar and therefore disadvantageously requires compression to the operating pressure before entering the combustion chamber. If a higher permeate pressure than 0.5 bar were selected so as to save compression energy, the driving force would be even lower, notably at the end of the separation process, and the achievable degree of $H_2$ separation would be less than approximately 90%.

FIG. 10 shows a simulation using a moderately flushed $H_2$ membrane, such as that which is described in the concepts of Göttlicher [1] and in DE 10 2008 011 771. The compressed $N_2$ generated from the air separation facility at a pressure of approximately 25 bar is used as the flushing gas. The mass flow ratio of $N_2$ to $H_2$ is no more than approximately 1:1.5, which means either that there is no driving force for the $H_2$ transport through the membrane or the driving force is substantially equal to zero. As a result, a high degree of separation will only be possible with unreasonably large membrane surfaces.

In contrast, the process according to the invention has considerable advantages. FIG. 11 shows the simulated $H_2$ separation for a strongly flushed $H_2$ membrane, wherein the flushing gas is provided in part from the air separation facility (compressed $N_2$ at 25 bar), however the majority is provided from the flue gas recirculation, also at 25 bar. The mass flow ratio of $N_2$ to $H_2$ now is approximately 4:1, which was determined by way of a simulation calculation using the commercial program PRO/II. Because of the strong flushing, the $H_2$ partial pressures in the flushing gas on the permeate side are low. The driving forces are therefore high, and notably at the end of the separation process the conditions are still sufficient (constantly positive driving force!) to achieve high separation degrees very close to 100%, which can be implemented by designing the membrane module with a moderately increased membrane surface.

The crucial advantage of the present invention is that the proposed operating process now allows very high $H_2$ separation degrees, for example of 97%, to be achieved, and a local significant increase in the membrane surface is only required in a small area at the end of the separation process, whereby the total surface of the membrane must only be slightly higher. The following considerations are provided as a reference.

In porous membranes, for example, the local permeate flow density is proportional to the driving force, which is to say to the $H_2$ partial pressure difference between the feed and permeate sides. Because the required local membrane surface is inverse to the permeate flow density, it is also inversely proportional to the $H_2$ partial pressure difference. In the middle of the separation process at 50% separation, this is approximately 5 bar, and with 90% and 97% separation, it is approximately 1 and 0.5 bar, respectively.

Assuming a membrane with 90% separation performance (on average, an approximately 5 bar driving force), approximately the same membrane surface again is additionally required to carry out the separation with a 90% to 97% degree of separation (in this end region, on average, an approximately 0.5 bar driving force).

$H_2$ separation degrees of 98 or 99% are also conceivable with strongly flushed $H_2$ membranes.

Further advantageous embodiments of the invention relate to improving the $CO_2$ separation and conditioning and the provision of oxygen and compressed $N_2$ by oxygen membranes instead of the aforementioned air separation facility.

Only a small quantity of hydrogen usually remains in the retentate of the $H_2$ membrane (3). This retentate substantially contains the carbon dioxide produced during the gas generation process as well as steam and the aforementioned remainder of hydrogen. This retentate has a pressure that is predetermined by the process. This pressure is preferably 20-30 bar and is usually only lowered by the pressure loss caused by the conductance of the gas flow through the apparatuses and pipes.

According to a particularly advantageous embodiment of the invention, the hydrogen remaining in the retentate is burned in a combustion step. The oxygen-containing gas required for this can advantageously be withdrawn from the oxidation gas upstream of the gasifier (1). In a special embodiment of the invention, for example, substantially pure oxygen can optionally be withdrawn for this purpose at an additional withdrawal site downstream of the oxygen compression and used in the combustion process.

The gas flow developing during this combustion which is under process pressure almost exclusively contains carbon dioxide ($CO_2$) and steam. A portion of this gas flow can be separated and, after cooling with condensation and separation of the water, supplied to the conditioning of the $CO_2$. The option for such an increase in the component of $CO_2$ in this gas is a key advantage of this concept, which can result in more effective and cost-effective conditioning of $CO_2$ from this power plant.

According to a further advantageous embodiment of the invention, which is also partially described in DE 10 2008 011 771, another portion can optionally be used as flushing gas for an oxygen membrane for the purpose of separating oxygen from air. For this purpose, compressed air is removed downstream of the air compressor of the gas turbine and supplied to an oxygen membrane on the primary side. The flushing gas, advantageously a branched-off flow from the residual gas, is supplied to the secondary side, this being the permeate side of the membrane. The $O_2$ membrane is preferably a membrane that conducts oxygen ions. However, it is also possible to use a different membrane that is suited for separating oxygen. The driving potential in this separation process is the difference of the partial pressures of the oxygen on the air side and the permeate side. The oxygen migrates through the membrane to the permeate side into the flushing gas. In this way, a considerable portion of or the entire oxygen quantity required for the coal gasification can be separated from the air using a membrane, instead of the otherwise conventional air separation facility.

The gas flow on the permeate side primarily contains oxygen, flushing gas, which is to say $CO_2$-rich residual gas, and foreign gases. The foreign gases substantially originate from the air, because they too permeate the membrane to a low degree. The ratio of the oxygen quantity to the quantities of these foreign gases is preferably around 20. Such a ratio usually allows for a carbon dioxide content in the dried waste gas of the gasification process of more than 95% by volume.

According to a further advantageous embodiment, which is also partially described in DE 10 2008 011 771, another portion of the oxygen quantity required for the gasification of the coal, this quantity being substantially free of foreign gases, can be yielded in a further separation step using a further membrane. Again, the ratio of the oxygen quantity to the foreign gas quantity in the permeate should preferably be around 20. However, no flushing gas is used on the permeate side to operate this further oxygen membrane. The partial pressure of the oxygen in the gas flow leaving this membrane on the permeate side is lower than the partial pressure of the oxygen on the retentate side. This creates a driving potential for oxygen permeation.

The oxygen flow that is obtained can be compressed to the necessary pressure by a compressor for further use. By varying the quantity, the oxygen yielded in this way can advantageously be used to regulate the oxygen concentration for gasification of the coal in the gasifier (1). If the oxygen membrane operated with flushing gas can supply the oxygen quantity required for the entire process, the second oxygen membrane and the related compressor may be eliminated.

The retentate from the oxygen membranes can be supplied as an oxidizing agent to the gas turbine. This will lower the demand for fresh air, which is supplied so as to limit the temperature of the gas turbine.

The waste gas flow (residual gas) originating from the combustion of the residual hydrogen, from which a portion is optionally separated upstream of the oxygen membrane, substantially comprises carbon dioxide and steam. Minor impurities can be due in particular to the different gas separation steps. This gas flow is present at the process pressure (gasifier pressure). The pressure in this gas flow is exclusively reduced by pressure losses caused by the gas flowing through the pipes and apparatuses. This pressure is maintained even after the gas has cooled to a temperature of below 40° C., for example, and after the related condensation of significant quantities of the water that is produced. After separating the water, the concentration of carbon dioxide $CO_2$ in the waste gas is more than 95% by volume.

In general, foreign gases can penetrate into the permeate when the separation of the gases in the membrane is incomplete. With the process described, however, the component of permanent gases is generally so low that a liquid phase of the $CO_2$ is possible even at ambient temperatures (up to 31° C.).

Because the pressure is substantially maintained in the process described, it is possible to liquefy the $CO_2$ using only one further pressure stage having only a low compression factor. With minor use of mechanical energy, liquid $CO_2$ can be brought to a pressure stage such as that which is required for underground storage or final waste disposal of the $CO_2$.

Figure 12:
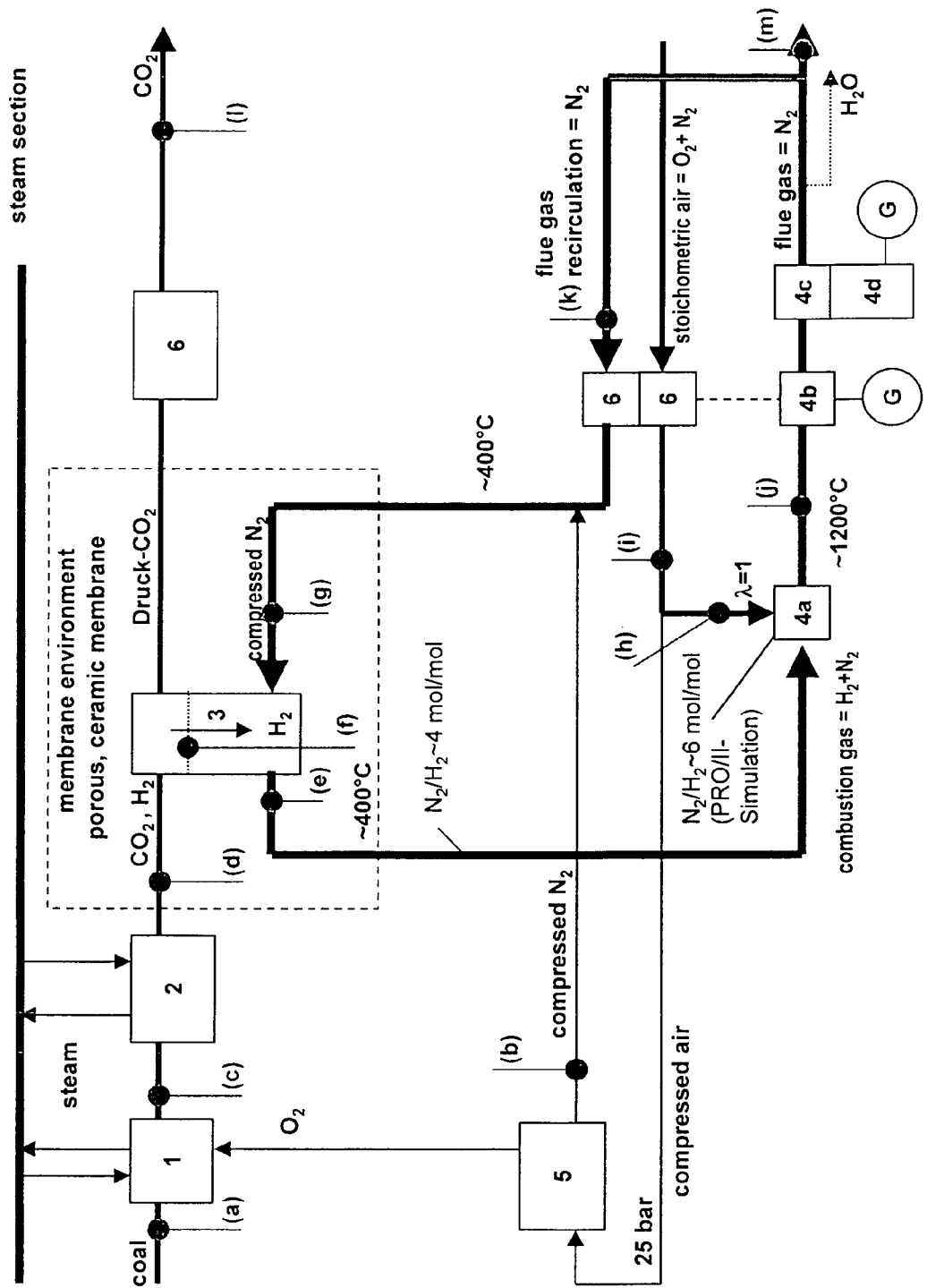
FIG. 12: shows standardized mole flows (rounded) as reference values in the flow chart of the IGCC power according to the invention (in the simple basic variant without additional measures for changing the temperature of the flushing gas), the schematic diagram of this power plant having already been shown in FIG. 6, wherein K=compressor, GT=gas turbine, G=generator, AHK=waste heat recovery boiler, and DT=steam turbine.

FIG. 12 shows the mass flow ratios in the IGCC process according to the invention to provide a better understanding. Rounded values (reference values) are shown for standardized mole flows at key positions of the power plant. The reference variable selected was: C input(=$CO_2$ output)=100 [arbitrary mole flow unit]. In the IGCC power plant, the following reactions (gasification/(shift/combustion)) take place:

$$4C+O_2+H_2O=2CO+2H_2$$

$$CO+H_2O=CO+H_2$$

$$2H_2+O_2=2H_2O$$

The standardized mass flows (reference values) marked with (a) to (m) in FIG. 12 are listed in the table below:

|        | (a) | (b) | (c) | (d) | (e) | (f) | (g) | (h) | (i) | (j) | (k) | (l) | (m) |
|--------|-----|-----|-----|-----|-----|-----|-----|-----|-----|-----|-----|-----|-----|
| C      | 100 | —   | —   | —   | —   | —   | —   | —   | —   | 100 | —   | —   | —   |
| $O_2$  | 25  | —   | —   | —   | —   | —   | —   | 75  | —   | —   | —   | —   | —   |
| $H_2O$ | 50  | —   | —   | —   | —   | —   | —   | —   | —   | 150 | —   | —   | —   |
| CO     | —   | —   | 100 | —   | —   | —   | —   | —   | —   | —   | —   | —   | —   |
| $CO_2$ | —   | —   | —   | 100 | —   | —   | —   | —   | —   | —   | —   | 100 | —   |
| $H_2$  | —   | —   | 50  | 150 | 150 | 150 | —   | —   | —   | —   | —   | —   | —   |
| $N_2$  | —   | 100 | —   | —   | 600 | —   | 600 | 300 | 400 | 900 | 500 | —   | 400 |

Literature cited in the application:

[1] Göttlicher, Gerold, "Energetik der Kohlendioxidrückhaltung in Kraftwerken (Energetics of carbon dioxide pressure maintenance in power plants)", (1999) VDI-Verlag GmbH, Düsseldorf, 1999, ISBN 3-18-342106-2

The invention claimed is:

1. A method for operating an IGCC power plant, comprising the following steps:
   supplying a solid fuel, steam, and oxygen to a gasifier;
   supplying the coal gas from the gasifier, comprising CO and steam, to at least one shift stage, where a conversion of the CO with steam primarily into $CO_2$ and hydrogen takes place;
   subjecting the coal gas to at least one gas cleaning step, with the gas cleaning step or steps being disposed upstream of, downstream of, or between individual shift stages;
   conducting hydrogen- and $CO_2$-containing coal gas over a membrane, which selectively at least partially separates the hydrogen from the coal gas, with a flushing gas being used on the side of the permeate;
   supplying the coal gas depleted of hydrogen to a $CO_2$ conditioning step; and
   supplying the separated hydrogen, together with the flushing gas, to a gas turbine having a downstream steam turbine; and
   wherein the flushing gas for the membrane is part of the waste gas produced in the gas turbine; and
   wherein the flushing gas is conducted directly from a heat recovery boiler connected downstream of the gas turbine to a compressor and then to the permeate side of the membrane.

2. The method for operating an IGCC power plant according to claim 1, wherein the waste gas contains no, or no more than 1% by volume, oxygen.

3. The method for operating an IGCC power plant according to claim 1, wherein a porous ceramic membrane, a mixed protonic-electronic conductor, or a polymer membrane is used as the membrane.

4. A method for operating an IGCC power plant according to claim 1, wherein the pressure of the flushing gas in the membrane is identical to that of the coal gas.

5. A method for operating an IGCC power plant according to claim 1, wherein at least 97% of the $H_2$ is separated from the hydrogen- and $CO_2$-containing coal gas by way of the membrane.

6. A method for operating an IGCC power plant according to claim 1, wherein the flushing gas is cooled before being introduced into the membrane.

7. A method for operating an IGCC power plant according to claim 1, wherein the flushing gas is compressed before being introduced into the membrane.

8. A method for operating an IGCC power plant according to claim 1, wherein the coal gas depleted of hydrogen is first burned before $CO_2$ conditioning.

9. The method for operating an IGCC power plant according to claim 8, wherein oxygen is used for combusting the depleted coal gas.

10. The method for operating an IGCC power plant according to claim 9, wherein oxygen from an air separation facility is used for combusting the depleted coal gas.

11. A method for operating an IGCC power plant according to claim 1, wherein the oxygen for the gasifier and/or for the combustion of the depleted coal gas is obtained by way of at least one oxygen-conducting membrane.

12. A method for operating an IGCC power plant according to claim 1, wherein the combustion chamber of the gas turbine is supplied air in a substantially stoichiometric ratio ($\lambda \sim 1$).

13. A method for operating an IGCC power plant according to claim 1, wherein nitrogen from an air separation facility is further used as the flushing gas for the membrane.

14. A method for operating an IGCC power plant according to claim 1, wherein at least 90% of the $H_2$ is separated from the hydrogen-and $CO_2$-containing coal gas by way of the membrane.

15. An IGCC power plant, comprising:
a gasifier for gasifying a solid fuel, wherein the gasifier receives oxygen;
at least one shift stage connected downstream of the gasifier for converting CO and steam into $CO_2$ and hydrogen;
at least one gas cleaning stage connected downstream of the gasifier;
a hydrogen-selective membrane connected downstream of the gasifier;
a gas turbine with a first line leading from the permeate side of the membrane to the combustion chamber of the gas turbine, the gas turbine providing flushing gas for the permeate side of the membrane;
wherein a second line is disposed from a heat recovery boiler connected downstream of the gas turbine to the permeate side of the membrane.

16. The IGCC power plant according to claim 15, wherein said first line and said second line are designed as a cycle system.

17. An IGCC power plant according to claim 15, wherein at least one heat exchanger is disposed on at least one of said first line and said second line.

18. An IGCC power plant according to claim 15, wherein at least one compressor is disposed on at least one of said first line and said second line.

19. An IGCC power plant according to claim 15, comprising a combustion chamber connected downstream of the retentate side of the membrane.

20. An IGCC power plant according to claim 15, further comprising an air separation facility that provides said oxygen for said gasifier.

21. An IGCC power plant according to claim 15, further comprising at least one further oxygen-selective membrane that provides said oxygen for said gasifier.

22. The IGCC power plant according to claim 21, further comprising two further oxygen-selective membranes that provides said oxygen for said gasifier.

23. The IGCC power plant according to claim 15, wherein the flushing gas is conducted directly from the heat recovery boiler connected downstream of the gas turbine to a compressor and then to the permeate side of the membrane.

24. An IGCC power plant, comprising:
a gasifier for gasifying a solid fuel, wherein the gasifier receives oxygen;
at least one shift stage connected downstream of the gasifier for converting CO and steam into $CO_2$ and hydrogen;
at least one gas cleaning stage connected downstream of the gasifier;
a hydrogen-selective membrane connected downstream of the gasifier; and
a gas turbine with a line leading from the permeate side of the membrane to the combustion chamber of the gas turbine; and
a gas turbine with a line leading from the permeate side of the membrane to the combustion chamber of the gas turbine, the gas turbine providing flushing gas for the permeate side of the membrane;
wherein a further line is disposed from a heat recovery boiler connected downstream of the gas turbine to the permeate side of the membrane; and
wherein additional flushing gas is provided to the permeate side of the membrane by a same device as that which provides oxygen to said gasifier.

25. The IGCC power plant according to claim 24, wherein said same device is an air separation facility.

26. The IGCC power plant according to claim 24, wherein said same device is an additional oxygen-selective membrane.

* * * * *